(12) United States Patent
Tan (10) Patent No.: US 12,502,028 B2
(45) Date of Patent: Dec. 23, 2025

(54) COOKING PHASE IDENTIFICATION

(71) Applicant: VERSUNI HOLDING B.V., Eindhoven (NL)

(72) Inventor: Jingwei Tan, Eindhoven (NL)

(73) Assignee: VERSUNI HOLDING B.V., Eindhoven (NL)

( * ) Notice: Subject to any disclaimer, the term of this patent is extended or adjusted under 35 U.S.C. 154(b) by 0 days.

(21) Appl. No.: 18/863,940

(22) PCT Filed: Mar. 9, 2023

(86) PCT No.: PCT/EP2023/056069
§ 371 (c)(1),
(2) Date: Nov. 7, 2024

(87) PCT Pub. No.: WO2023/217436
PCT Pub. Date: Nov. 16, 2023

(65) Prior Publication Data
US 2025/0160565 A1    May 22, 2025

(30) Foreign Application Priority Data

May 7, 2022 (WO) ................ PCT/CN2022/091564
Jul. 5, 2022 (EP) ..................................... 22183149

(51) Int. Cl.
G06T 7/90 (2017.01)
A47J 36/32 (2006.01)
(Continued)

(52) U.S. Cl.
CPC ................ *A47J 36/32* (2013.01); *G06T 7/90* (2017.01); *G06V 10/25* (2022.01); *G06V 20/68* (2022.01); *G06T 2207/20104* (2013.01)

(58) Field of Classification Search
CPC .. A47J 36/32; G06T 7/90; G06T 2207/20104; G06V 10/25; G06V 20/68
(Continued)

(56) References Cited

U.S. PATENT DOCUMENTS

| 9,538,880 B2* | 1/2017 | Riefenstein | ............ H05B 6/687 |
| 2016/0278563 A1* | 9/2016 | Choudhary | ............... A23L 5/00 |

(Continued)

FOREIGN PATENT DOCUMENTS

| CN | 106446909 A | 2/2017 |
| CN | 110956217 A | 4/2020 |

(Continued)

OTHER PUBLICATIONS

Gokmen, V. et al., "Computer vision-based image analysis for the estimation of acrylamide concentrations of potato chips and french fries", Food Chemistry, vol. 101, Issue 2, pp. 791-798, Sep. 10, 2006.

(Continued)

*Primary Examiner* — Ali Bayat
(74) *Attorney, Agent, or Firm* — Maschoff Brennan (57) ABSTRACT

A cooking method includes receiving first image data and second image data corresponding to a view of a food item at a first time and at a second time of a cooking process, respectively. A perimeter of the food item visible in the view encloses a first area of the food item. A region of interest in the view that maps to a second area of the food item is selected, which is less than the first area. A phase of the cooking process is identified based on a comparison of a first color of the food item at the first time with a second color of the food item at the second time. The first and second colors are derived from a part of the first image data and a part of the second image data, respectively, that correspond to the region of interest.

15 Claims, 6 Drawing Sheets

(51) Int. Cl.
*G06V 10/25* (2022.01)
*G06V 20/68* (2022.01)

(58) Field of Classification Search
USPC .......................................................... 382/110
See application file for complete search history.

(56) References Cited

U.S. PATENT DOCUMENTS

| | | | | |
|---|---|---|---|---|
| 2018/0202667 | A1* | 7/2018 | Cheng | F24C 7/085 |
| 2019/0053332 | A1* | 2/2019 | Cheng | F24C 7/046 |
| 2019/0057282 | A1* | 2/2019 | Lee | A47J 27/00 |
| 2020/0182481 | A1* | 6/2020 | Bhogal | A23L 5/17 |
| 2021/0142110 | A1* | 5/2021 | Tian | G06V 20/68 |

FOREIGN PATENT DOCUMENTS

| | | |
|---|---|---|
| CN | 112056945 A | 12/2020 |
| CN | 112741508 A | 5/2021 |
| CN | 110123149 B | 8/2021 |
| CN | 111358306 B | 8/2021 |
| CN | 113838004 A | 12/2021 |
| JP | 2021131179 A | 9/2021 |
| KR | 10-2022-0045370 A | 4/2022 |
| WO | 2014/107081 A1 | 7/2014 |
| WO | 2020148418 A1 | 7/2020 |

OTHER PUBLICATIONS

Romani, S. et al., "Image characterization of potato chip appearance during frying", Journal of Food Engineering, vol. 93, Issue 4, pp. 487-494, Aug. 1, 2009.
Extended European Search Report issued in connection with corresponding EP Application No. 22183149.8 dated Dec. 9, 2022.

* cited by examiner

COOKING PHASE IDENTIFICATION

CROSS-REFERENCE TO RELATED APPLICATIONS

The present application is a U.S. National Phase application under 35 U.S.C. § 371 of International Application No. PCT/EP2023/056069, filed on Mar. 9, 2023, which claims the benefit of European Patent Application No. 22183149.8, filed on Jul. 5, 2022 and International Patent Application No. PCT/CN2022/091564, filed on May 7, 2022. These applications are hereby incorporated by reference herein.

TECHNICAL FIELD OF THE INVENTION

The invention relates to a cooking method, a non-transitory machine-readable medium and a cooking apparatus for identifying a phase of a cooking process.

BACKGROUND OF THE INVENTION

Cooking apparatus may implement cooking processes such as roasting, grilling, frying, air frying, etc., to cook food. When cooking food, consumers may use a recipe which indicates the approximate required cooking time and heating temperature to determine when the food is likely to be completely cooked. For example, when baking a certain type of cake, the recipe may indicate that the cake needs to be cooked for 60 minutes with a heating temperature of 160° C. However, consumers cannot be sure whether the cake is undercooked or overcooked in this time. There are some tips like checking the cake 10 minutes prior to the time indicated in the recipe by inserting a probe into the cake to check whether there is some raw cake dough stuck to the probe after removing the probe. However, this may not be considered to be convenient. In some cases, the checking period may be in the range of more than 20 minutes, which means the cake might be done more than 10 minutes earlier or more than 10 minutes later than expected by the recipe.

Some control technologies exist to check how well cooked a food item is as a result of a cooking process. A doneness level may be defined for the food item to indicate by how much food item has been cooked. Examples of doneness level may include: raw, undercooked, cooked, overcooked, burnt, etc. Each doneness levels may be achieved during a certain phase of the cooking process. In an example control technology, a scale may be used to detect a weight change during the cooking process where the weight change may indicate how well cooked the food item is (e.g., moisture lost due to cooking may reduce the weight of the food item). While the doneness of some food can be checked using weight change, some food types and/or cooking processes may not be compatible with this technology. For example, some cooking processes use water bathing, or use hot air such as in an air fryer. In these cases, any detected weight loss may not provide an accurate indications of whether the food item is cooked.

When food is cooking, there may be a change of visual features such as color, texture, size, etc. Computer vision technology may have utility in the food industry. For example, computer-vision may be used for food quality detection in a commercial setting e.g., to remove rotten fruits, maintain the final consistent food quality, like cookies, etc. However, these technologies may not be used during the cooking process itself. The food industry may carefully control parameters such as heating time, temperature, ingredients, recipe, etc., in order to obtain a consistent cooking result without needing to monitor the cooking process itself. In contrast, in the consumer home cooking environment, the food ingredients, temperature, cooking time, recipe used, cooking skill, type of cooking apparatus used, etc., may vary by consumer. Thus, the consumer may not have a consistent cooking experience no matter how closely they follow a recipe. Thus, the consumer may need to check the cooking process, which may be burdensome or even ruin the cooking process.

SUMMARY OF THE INVENTION

Certain aspects or embodiments described herein relate to identifying a phase of a cooking process based on a color of a food item. Certain aspects or embodiments may reduce or obviate certain problems associated with checking how well cooked a food item is during a cooking process in various settings.

In a first aspect, a cooking method is described. The method comprises receiving first image data corresponding to a view of a food item at a first time of a cooking process implemented by a cooking apparatus. A perimeter of the food item visible in the view encloses a first area of the food item. The method further comprises receiving second image data corresponding to the view of the food item at a second time of the cooking process. The method further comprises selecting a region of interest in the view. The region of interest maps to a second area of the food item. The second area is less than the first area. The method further comprises identifying a phase of the cooking process based on a comparison of a first color of the food item at the first time with a second color of the food item at the second time. The first color is derived from a part of the first image data that corresponds to the region of interest. The second color is derived from a part of the second image data that corresponds to the region of interest.

Some embodiments relating to the first and the other aspects are now described.

In some embodiments, the method comprises comprising determining whether or not the identified phase of the cooking process corresponds to an expected phase of the cooking process based on recipe instructions for the food item and/or historical cooking data for the food item.

In some embodiments, the recipe instructions comprise a cooking temperature and a cooking time at the cooking temperature for each phase of the cooking process. The historical cooking data may comprise the cooking temperature and the cooking time at the cooking temperature used to cook the food item previously in the cooking process.

In some embodiments, the method comprises instructing the cooking apparatus to modify the cooking process in response to the recipe instructions being indicative of a different cooking temperature and/or cooking time at the cooking temperature to use for the identified phase of the cooking process or a subsequent phase of the cooking process.

In some embodiments, the method comprises instructing the cooking apparatus to modify the cooking process in response to the identified phase of the cooking process being indicative of a deviation from the expected phase of the cooking process.

In some embodiments, the phase comprises an expanding phase in which the food item expands as a result of the cooking process.

In some embodiments, the phase comprises a shrinking phase in which the food item shrinks as a result of the cooking process.

In some embodiments, the phase comprises a size stable phase in which the food item stays the same size.

In some embodiments, the phase comprises a pigmentation change phase in which a pigmented component of the food item escapes from the food item or undergoes a chemical change as a result of the cooking process.

In some embodiments, the phase comprises a doneness phase in which the cooking process is completed and/or browning of the food item occurs as a result of the cooking process.

In some embodiments, the first color is derived from pixel intensity data associated with the part of the first image data that corresponds to the region of interest, and the second color is derived from pixel intensity data associated with the part of the second image data that corresponds to the region of interest.

In some embodiments, the method comprises deriving the first color from the pixel intensity data for the part of the first image data that corresponds to the region of interest. The method may further comprise deriving the second color from the pixel intensity data for the part of the second image data that corresponds to the region of interest. The method may further comprise comparing the first color with the second color to determine a color change between the first and second times. The method may further comprise identifying the phase by comparing the color change with a threshold indicative of the phase of the cooking process.

In some embodiments, the first and second color is represented by a color channel of a color model for representing color of the food item.

In some embodiments, the color model is a red-green-blue, RGB, color model. In some embodiments, the first and second color is represented by a single color channel of the RGB color model.

In some embodiments, the method comprises applying a function to: the pixel intensity data for the part of the first image data to derive the first color; and the pixel intensity data for the part of the second image data to derive the second color.

In some embodiments, the function comprises an averaging function to compute an average pixel intensity value corresponding to the first color or second color. The average pixel intensity value corresponding to the first color or second color may be computed from the pixel intensity data of a set of pixels corresponding to the part of the first image data or second image data, respectively. The set of pixels may be associated with the color channel.

In some embodiments, the function comprises a weighting function to compute a weighted pixel intensity value corresponding to the first color or second color. The weighted pixel intensity value corresponding to the first color or second color may be computed from a weighted combination of the pixel intensity data of a plurality of subsets of the set of pixels corresponding to the part of the first image data or second image data, respectively. Each subset may be associated with a different color channel.

In some embodiments, the method comprises using a segmentation model to segment the first image data to identify the perimeter and/or at least part of the first area of the food item. The method may further comprise selecting the region of interest in the segmented first image data. The method may further comprise using the same region of interest in the second image data.

In some embodiments, the method comprises selecting the region of interest based on a selection rule. In some embodiments, the selection rule indicates a location of the region of interest to use for the food item. In some embodiments, the selection rule indicates a shape of the region of interest. In some embodiments, the selection rule indicates the location and/or shape based on a positioning rule about positioning of the region of interest with respect to a segmented part of the first and second image data. In some embodiments, the selection rule indicates the location and/or shape based on a type of the food item. In some embodiments, the selection rule indicates the location and/or shape based on a design of the cooking apparatus.

In some embodiments, the method is implemented by a processor of the cooking apparatus.

In a second aspect, a non-transitory machine readable medium is described. The non-transitory machine readable medium stores instructions readable and executable by a processor to implement the cooking method of the first aspect or any one of the related embodiments.

In a third aspect, a cooking apparatus for implementing a cooking process is described. The cooking apparatus comprises a cooking chamber for receiving a food item. The cooking apparatus further comprises a housing defining the cooking chamber. The cooking apparatus further comprises an air circulation system for circulating air flow inside the cooking chamber. The cooking apparatus further comprises a camera for capturing images during the cooking process. The cooking apparatus further comprises a controller configured to implement the cooking apparatus of the first aspect or any one of the related embodiments.

Certain aspects or embodiments described herein may provide various technical benefits such as improving the accuracy of identifying a phase of a cooking process, reducing compute resources needed to identify a phase of the cooking process, providing a simple but reliable way to identify the phase of the cooking process without resorting to complex methods for checking doneness (e.g., such as machine learning methods), facilitating local processing of the identification of the phase of the cooking process to reduce the cost of the compute resources needed in the cooking apparatus and/or reduce the need to rely on a cloud-based system or a communication network in order to verify how well a food item has been cooked, etc.

These and other aspects of the invention will be apparent from and elucidated with reference to the embodiment(s) described hereinafter.

BRIEF DESCRIPTION OF DRAWINGS

Exemplary embodiments of the invention will now be described, by way of example only, with reference to the following drawings, in which:

FIGS. 4 (a)-(b) schematically depict example images of a food item during a cooking process;

FIGS. 6 (a)-(c) are graphs representative of experimental data collected during a cooking process implemented according to various embodiments;

DETAILED DESCRIPTION OF THE EMBODIMENTS

As referred to herein, a "cooking process" refers to applying heat to a food item to cause a change in the food item. Such application of heat may result in a mere warming of the food item, or a more substantial change in the food item such as may be achieved by using cooking methods such as roasting, grilling, frying, air frying, etc.

As referred to herein, a "cooking apparatus" refers to any device capable of applying heat to a food item, in order to complete the cooking process as referred to above. Heat may be applied to the food item by the cooking apparatus in one or multiple ways such as by conduction, convection or radiation. Examples of cooking apparatus include: an oven, microwave oven, hob, air fryer, etc.

It can be difficult to check how well cooked a food item is during a cooking process. For example, there may be challenges with checking the doneness level of a food item during a cooking process in various settings such as at home or in a dedicated food preparation factory. Although certain technologies exist for this purpose, they may be difficult and/or costly to implement due to their complexity and/or they may not be feasible for a user/consumer to implement at home. Certain embodiments described herein may reduce or obviate certain problems associated with checking how well cooked a food item is during a cooking process.

Figure 1:
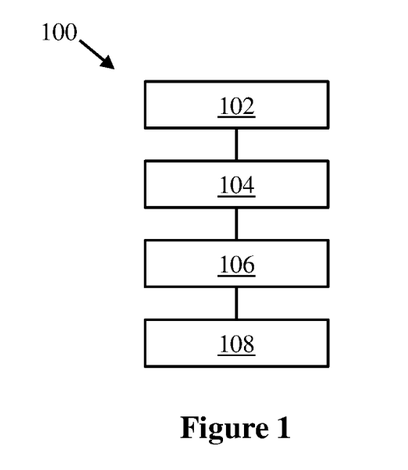
FIG. 1 refers to a cooking method according to an embodiment.

FIG. 1 refers to a cooking method 100 according to an embodiment. The cooking method 100 may be computer-implemented e.g., by a processor of a cooking apparatus, as described in more detail below. Image data may be obtained by a camera during the cooking process. The image data may depict at least part of a food item during the cooking process. Changes to the color of the food item during the cooking process may be detected via the image data. Thus, the method 100 may be implemented to identify a phase of a cooking process based on a color of the food item.

The method 100 comprises, at block 102, receiving first image data corresponding to a view of a food item at a first time of a cooking process implemented by a cooking apparatus. A perimeter of the food item visible in the view encloses a first area of the food item.

As described in more detail below, a camera may image at least part of the food item within its field of view. Within this field of the view, a perimeter of the food item may be visible to the camera. The perimeter may refer to an outer edge of the food item according to the view (i.e., a different perimeter may be visible if the food item is imaged from a different direction). In other words, the perimeter of the food item visible to the camera may correspond to the angular size of the food item according to the view of the food item as observed by the camera. This means that the visible part of the food item imaged by the camera may map to part (i.e., a subset of pixels) of a detection area (i.e., the complete set of pixels for forming the image) of the camera. In some cases, part of the food item may be within the field of view but another part of the food item may be outside the field of view or the other part of the food item may be partially obscured by another object such as another food item. Whichever part of the food item is visible to the camera, a perimeter of the food item may be visible. This perimeter encloses a first area of the food item where the first area may correspond to the angular size of the food item. Thus, the first area may map to a certain subset of pixels of the camera.

Thus, within the image data, certain pixels may provide a record of the pixel intensity values indicative of the color of the food item at the time during the cooking process when the food item was imaged.

The method 100 further comprises, at block 104, receiving second image data corresponding to the view of the food item at a second time of the cooking process. The second image data may be acquired by the same camera as used to acquire the first image data although, in some cases, it may be possible for a different camera to acquire the first and second image data though this may add complexity.

The method 100 further comprises, at block 106, selecting a region of interest in the view. The region of interest maps to a second area of the food item. The second area is less than the first area. That is, if the first area corresponds to the angular size of the food item visible to the camera, the second area is less than the angular size of the food item. If the first area maps to a (first) subset of pixels of the camera, then the second area maps to a second subset of pixels of the camera. In some cases, the second subset of pixels is a subset of the first subset of pixels (e.g., where the region of interest is within the first area). In some cases, at least one of the second subset of pixels is selected from the first subset of pixels and at least one other of the second subset of pixels is selected from another pixel that does not map to the food item (e.g., if the region of interest includes the perimeter of the food item). There are various ways to select the region of interest. Examples of ways to select the region of interest is described in more detail below.

The method 100 further comprises, at block 108, identifying a phase of the cooking process. The identifying is based on a comparison of a first color of the food item at the first time with a second color of the food item at the second time. The first color is derived from a part of the first image data that corresponds to the region of interest. The second color is derived from a part of the second image data that corresponds to the region of interest.

The first and second color may be derived from the pixel intensity values recorded for the pixels corresponding to the region of interest at the first and second times (i.e., from the first and second image data, respectively). There are various ways to derive the color, based on the format of the image data. For example, if the image data comprises pixel intensity values for the red, green and blue (RGB) channels, the first and second colors may be derived from the pixel intensity values for at least one of the RGB channels. Not all of the pixels may record the same pixel intensity values. Therefore, a function may be applied (as described in more detail below) in order to derive the first and second color. In another example, a different color model may be used to represent color in the region of interest. For example, the hue-saturation-value (HSV) color model may be used by the first and second image data. In some cases, the raw imaging data from the camera (which may be in the RGB format) may be conveniently used to avoid extra processing needed for transforming to different color coordinates. However, in some cases, the colors may still be derived from image-processed image data.

Method 100 and certain other embodiments described herein may provide various technical benefits such as improving the accuracy of identifying a phase of a cooking process, reducing compute resources needed to identify a phase of the cooking process, providing a simple but reliable way to identify the phase of the cooking process without resorting to complex methods for checking doneness (e.g., such as machine learning methods), facilitating local processing of the identification of the phase of the cooking process to reduce the cost of the compute resources needed in the cooking apparatus and/or reduce the need to rely on a cloud-based system or a communication network in order to verify how well a food item has been cooked, etc.

According to the method 100, the area of the region of interest is smaller than the visible area of the food item, as defined by its perimeter. Thus, the data size of pixel intensity values derived from the region of interest is less than the data size of pixel intensity values derived from the visible area of the food item. Using data from fewer pixels than the total available pixels corresponding to the visible area of the food item may reduce the compute resources (including processing and/or memory resources) needed to identify the phase of the cooking process due to the reduced data size. The color comparison of block 108 may be relatively simple to compute so that the method 100 may provide a simple but reliable way to identify the phase. In some cases, local processing (e.g., by a processor of the cooking apparatus) may be made possible due to the relative simplicity of the color comparison. In some cases, the processing and memory needed to implement the method 100 and other embodiments may be relatively straightforward and/or cost effective to provide in a cooking apparatus. For example, the relative simplicity and accuracy of the method 100 and other embodiments described herein may obviate the need to rely on more complex technologies for identifying the phase based on color such as certain machine (learning) vision technologies, which may need more processing and memory resource and may be less cost effective or straightforward to implement in a consumer device such as a cooking apparatus. In some cases, by using the same region of interest in both the first and second image data (e.g., the region of interest may correspond to a fixed/same subset of pixels in both the first and second image data), fewer compute resources may be needed because there may be no need to duplicate certain processes such as segmentation and/or region of interest identification, as described in more detail below. That is, once the region of interest is selected for the first image data, there may be no need to re-identify and/or re-select the region of interest for the second image data, which may reduce usage of compute resources. In some cases, the region of interest could change/be re-selected between the first and second image data but this implies increased use of compute resources.

Figure 2:
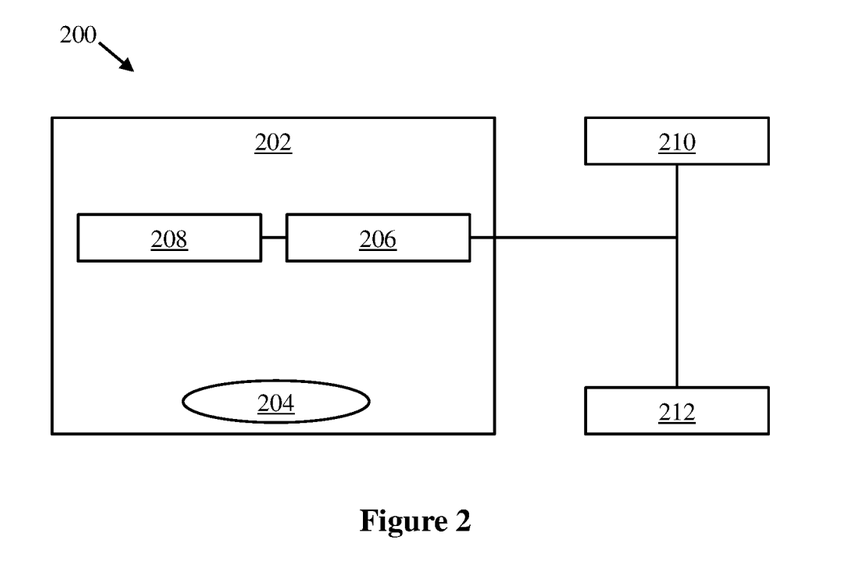
FIG. 2 is a schematic drawing of a cooking ecosystem according to an embodiment.

FIG. 2 is a schematic drawing of a cooking ecosystem 200 according to an embodiment. Certain embodiments described herein (e.g., cooking method 100) may be implemented in certain parts of the cooking ecosystem 200. The cooking ecosystem 200 depicts various devices and entities which may be deployed as part of the cooking ecosystem 200. Not every device or entity depicted may be needed in some scenarios, as explained below.

The cooking ecosystem 200 comprises a cooking apparatus 202 for cooking a food item 204. The cooking apparatus 202 comprises a controller 206 for controlling the cooking process. For example, the controller 206 may control a heating element (not shown) of the cooking apparatus 202 (e.g., to control the cooking temperature of the cooking apparatus 202). The controller 206 is communicatively coupled to a camera 208 for capturing images. The camera 208 is positioned such that a region of interest associated with the food item 204 is within a field of view of the camera 208. This particular configuration is an example. For example, the camera 208 may or may not be inside the cooking apparatus 202 but may still have the food item 204 within its field of view, even if the camera 208 is external to the cooking apparatus 202.

In some cases, the cooking ecosystem 200 comprises a cloud computing service 210 communicatively coupled to the controller 206. A cloud computing service 210 may provide data storage and/or data processing services. The cloud computing service 210 may provide computing resource where there is insufficient computing resource available in any connected devices. In some cases, the cloud computing service 210 may provide updates and other services for the cooking apparatus 202.

In some cases, the cooking ecosystem 200 comprises a user equipment 212 communicatively coupled to the controller 206. A user equipment 212 may refer to any computing device associated with a user (e.g., of the cooking apparatus 202). Examples of user equipment 212 include: a smartphone, smartwatch, tablet, Internet of Things (IoT) device, etc. In some cases, the user equipment 212 may be communicatively coupled to the cloud computing service 210.

Any one or combination of the controller 206, cloud computing service 210 and the user equipment 212 may be used to implement the cooking method 100 and other embodiments described herein. For example, in some cases, the controller 206 may implement the cooking method 100 and related embodiments. In this regard, the controller 206 may comprise a processor (not shown) for implementing the cooking method 100 and related embodiments. In other cases, processing circuitry associated with the various devices and entities of the cooking ecosystem 200 may implement the cooking method 100 and related embodiments.

Figure 3:
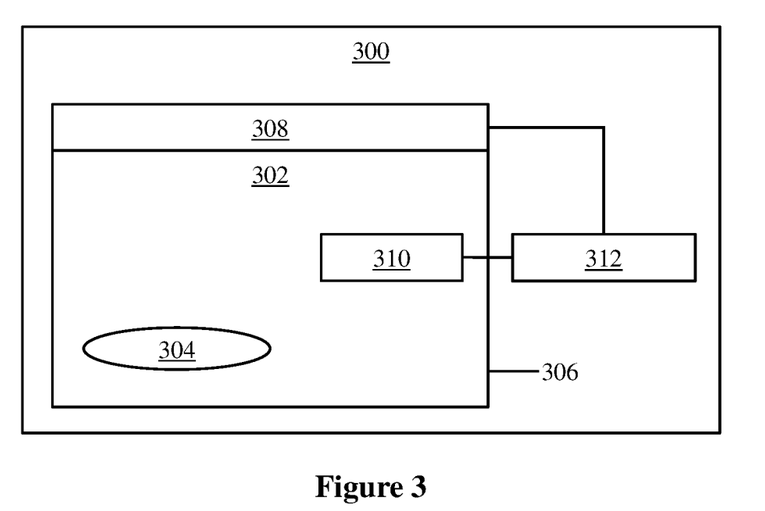
FIG. 3 is a schematic drawing of a cooking apparatus for implementing a cooking process according to an embodiment.

FIG. 3 is a schematic drawing of a cooking apparatus 300 for implementing a cooking process according to an embodiment. The cooking apparatus 300 may implement the functionality of certain embodiments described herein such as described in relation to the cooking method 100 of FIG. 1. Certain features of the cooking apparatus 300 may correspond to or have similar functionality to features of the cooking apparatus 202 of FIG. 2.

The cooking apparatus 300 comprises a cooking chamber 302 for receiving a food item 304. The cooking apparatus 300 further comprises a housing 306 defining the cooking chamber 302. The cooking apparatus 300 further comprises an air circulation system 308 for circulating air flow inside the cooking chamber 302. Therefore, in this regard, the cooking apparatus 300 may have a similar form to a fan oven or an air fryer. The cooking apparatus 300 further comprises a camera 310 for capturing images (of the "view" associated with the food item 304) during the cooking process. The captured images may correspond to or be used to derive the first and second image data.

The cooking apparatus 300 further comprises a controller 312 such as corresponding to the controller 206 of FIG. 2. In this embodiment, the controller 312 is configured to implement the cooking method 100.

Thus, the controller 312 is configured to receive, at block 102, first image data corresponding to a view of a food item at a first time of a cooking process implemented by a cooking apparatus. A perimeter of the food item visible in the view encloses a first area of the food item.

The controller 312 is further configured to receive, at block 104, second image data corresponding to the view of the food item at a second time of the cooking process.

The controller 312 is further configured to select, at block 106, a region of interest in the view. The region of interest maps to a second area of the food item. The second area is less than the first area.

The controller 312 is further configured to identify, at block 108, a phase of the cooking process based on a comparison of a first color of the food item at the first time with a second color of the food item at the second time. The first color is derived from a part of the first image data that corresponds to the region of interest. The second color is derived from a part of the second image data that corresponds to the region of interest.

Although FIG. 3 describes that the controller 312 of the cooking apparatus 300 implements the cooking method 100, in some cases, other devices or entities (such as depicted by FIG. 2) may implement at least some of the functionality of the cooking method 100 (and related embodiments).

Figure 4:
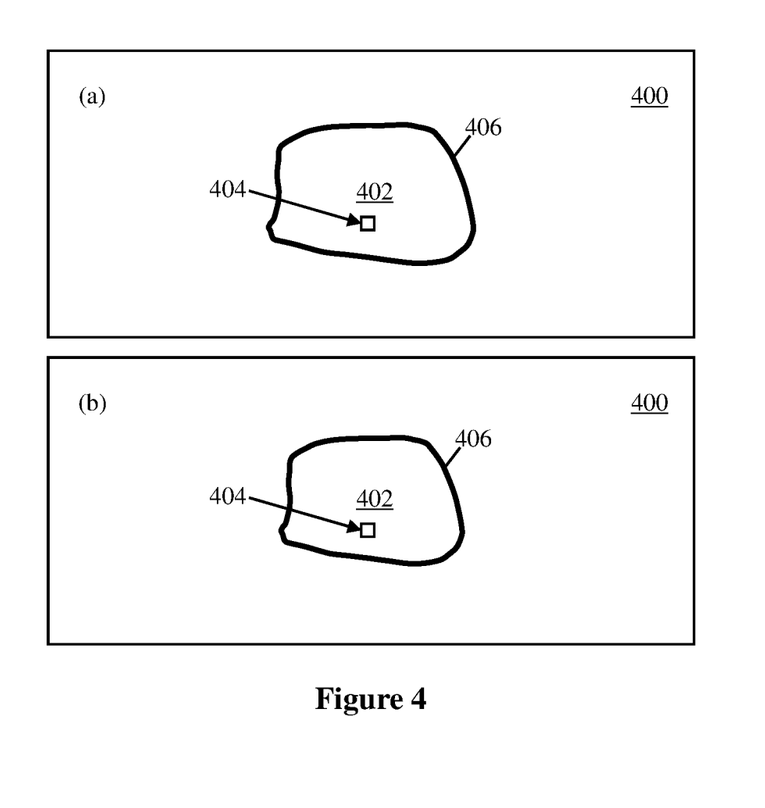

FIGS. 4 (a)-(b) schematically depict example images 400 of an example food item 402 during a cooking process (i.e., each image depicts a "view" of the food item 402) at the first and second times, respectively. In accordance with certain embodiments described herein, a region of interest 404 is selected. As shown by FIGS. 4 (a)-(b), this region of interest 404 is a box/window corresponding to a portion of the visible area of the food item 402 (although a different shape of region of interest could be used). A perimeter 406 of the food item 402 is visible in the view of the food item 402. The perimeter 406 defines a first area of the food item 402 (i.e., the angular size of the food item 402), which maps to a first subset of pixels of the camera (e.g., camera 310) used to image the food item 402. The region of interest 404 maps to a second subset of pixels of the camera (in this case, the second subset of pixels includes pixels that are also within the first subset).

It is apparent that the example food item 402 has shrunk between the first and second times based on a comparison of FIGS. 4 (a) and (b). Not all food types may shrink during a cooking process. Some food types may expand and some may stay the same size. Thus, the nature of the changes to the food item (e.g., color, size, texture, etc.) may depend on the food type, the cooking process being implemented and/or the phase of the cooking process. Since a color change to the food item may be visible to the camera, it may be possible to identify a phase of the cooking process in accordance with various embodiments described herein.

An example implementation of a cooking method (e.g., based on the cooking method 100) according to an embodiment is now described with reference to FIGS. 4 (a)-(b).

In this example implementation, a region of interest is selected. The region of interest may correspond to a subset of the pixels of the camera (at least one of which corresponds to a pixel that maps to a visible part of the food item). For example, a region of interest of size 60 by 60 pixels (which equals 3600 pixels) may provide suitable pixel intensity data to implement various embodiments described herein. For a 1080p camera with pixel resolution 1920 by 1080 pixels (which equals 2.1 Megapixels), the subset of 3600 pixels represents a small proportion of the overall number of pixels. Other camera pixel resolutions and region of interest sizes may be used to implement the embodiments described herein.

In some cases, the selection of the region of interest may be performed based on a pre-defined protocol or rule (e.g., a "selection rule") for selecting the region of interest within an image. For example, once the perimeter has been identified, the selection of the region of interest may be based on a geometrical consideration (that is, a coordinate defining a location of the region of interest within the area of the food item could be selected with respect to the coordinates of the perimeter). For example, the selection rule may specify the size/shape of the region of interest, as well as the location (e.g., based on a "positioning rule") with respect to the perimeter of the food item. In one example, a location defining the region of interest could be a center pixel, top-left-hand pixel, etc., of the region of interest. The size of the region of interest could be pre-set (e.g., a certain number of pixels in the horizontal and vertical directions with respect to the location). The location could then be set with respect to the detected perimeter of the food item. For example, the uppermost and lowermost pixels of the perimeter may be identified (to determine the apparent (vertical) height of the food item in the image). The vertical location (e.g., y coordinate) of the region of interest could then be set at some predefined point (e.g., one third from the bottom, half-way up, etc., along the height of the food item) along the vertical (y-axis) direction. Similarly, the most left-hand point and most right-hand point of the perimeter may be identified (to determine the apparent (horizontal) width of the food item in the image). The horizontal location (e.g., x coordinate) of the region of interest could then be set at some predefined point (e.g., half-way across the width of the food item, etc.) along the horizontal direction.

In some cases, the location could be at some point on the food item that is considered useful for performing color analysis. Some cooking apparatus may include an illumination system which may lead to saturated colors (e.g., white) on the part of the food item directly facing the illumination system. However, the side of the food item may be less saturated. The location of the region of interest may then be selected as being on the side of the food item. This location could be determined in a pre-defined manner based on knowledge of the illumination system and camera system position with respect to the location of the food item. If the camera is above and to the side of the food item in the cooking chamber (so that it images the top and side of the food item) and the illumination system provides illumination towards the top of the food item, then selecting the region of interest at a location that is in the lower-half of the area of the food item within the view of the camera may yield less-saturated colors. This example arrangement is represented by FIGS. 4 (a)-(b) where the region of interest 404 is in the lower half of the food item 402. In some cases, the shape of the food item may influence which location on the food item is appropriate for the region of interest. In some cases, the region of interest may be selected based on which pixels of the image data do not appear to be too saturated or too dark (e.g., based on a maximum and minimum pixel intensity threshold, respectively). In some cases, the region of interest could be selected at random from the identified area of the food item. The above description refers to various ways to select the region of interest. However, various other possible ways to select the region of interest exist.

Thus, in some embodiments, selecting the region of interest is based on a rule (e.g., a "selection rule"). The selection rule may specify a location and/or size of the region of interest with respect to the perimeter of the food item. The selection rule may specify a positioning rule which may specify the location of the region of interest with respect to at least one coordinate (e.g., pixel) of the perimeter. The positioning rule may specify a first distance (e.g., in pixels) from the location to a first coordinate of the perimeter. The positioning rule may specify a second distance from the location to a second coordinate of the perimeter (where the second coordinate may be on the opposite side of the visible part of the food item). The first and second distance may be the same or different. The selection rule may specify the size of the region of interest (e.g., number of pixels and/or the shape of the region of interest).

In some cases, a plurality of regions of interest are selected in the view. In some cases, a plurality of food items may be visible in the view. At least one of the food items may have at least one associated region of interest monitored during the cooking process. In some cases, the selection of the region of interest may be based on the food type (for example, different positions/sizes of regions of interest may be needed for different types of food). In some cases, the region of interest may be selected before or at the beginning of the cooking process.

In this example implementation, a mean color value is derived from the subset of pixels at each time interval (e.g., at the first time, second time, third time and so on). In some cases, the pixel intensity values for a single color channel (such as the green channel) in the region of interest may be used to determine the mean color value (e.g., by adding up all of the green pixel intensity values in the region of interest and divide by the total number of green pixels in the region of interest). Using a single color channel may save compute resources compared with the case of using a plurality of color channels. In some cases, a plurality of color channels (e.g., selected from RGB, etc.) may be used to derive the color e.g., based on a function as described below. The first and second colors are determined for the first and second times, respectively. However, the comparison according to block 108 of the method 100 may be performed repeatedly during the cooking process (e.g., at a regular interval such as every 2 minutes during the cooking process, although another interval could be used or irregular intervals could be used).

If the "first time" is the start of the cooking process and the "second time" is the end of the first time interval (e.g., after 2 minutes), the comparison of the first and second color data at the first and second times may be performed. The comparison may be repeated for each successive time interval. For example, the next comparison may be between the second time and a third time (e.g., 2 minutes later). Thus, where reference is made to a comparison "between a first time and second time", this refers to a comparison between the start and end of any time interval of the cooking process (e.g., between 0 and 2 minutes, between 2 and 4 minutes, between 4 and 6 minutes, etc.). In other similar words, the comparison may be performed repeatedly during the cooking the process and the comparison is based on two successively acquired image data (at the start and end of a time interval). However, in some cases, the comparison at each time interval could be made with the start color (i.e., t=0).

Different food types may need different monitoring intervals. For example, the second time could be 5 minutes after the cooking process has started for meat, or 40 minutes after the cooking process has started for cake. After the second time, the next time at which an image is acquired could be after a different time interval has elapsed such as every 2 minutes (e.g., to increase the likelihood of detecting overcooking, which may be more likely at a later phase of the cooking process).

In this example implementation, the comparison of the first and second color refers to calculating the change of the color value and comparing the change with a pre-set threshold (e.g., based on the food type) to identify the corresponding cooking phase. In some cases, the cooking process may be modified for the identified phase (e.g., a change of temperature and/or cooking time may be implemented to speed up/slow down the cooking the process).

Various cooking phases may be observed for different food types.

For bakery-type food such as cookies, bread, cake, etc., example cooking phases include a food size growing phase (where the food item expands), a size stable phase (where the food item has stopped expanding) and a doneness phase (with different doneness levels, which might be indicated by browning level or cooking time).

For meat-type food such as chicken breast, salmon, etc., example cooking phases include a red/yellow pigment disappearing phase (e.g., where juices run out of the meat or chemical changes take place), a color stable phase (where the color does not change significantly) and a doneness phase (with different doneness levels, which might be indicated by browning level or cooking time).

Further phases are possible for these and other types of food. Any of these phases may or may not be indicated by a color change.

Another example implementation of a cooking method (e.g., based on the cooking method 100) according to an embodiment is now described with reference to FIGS. 4(a)-(b). This example implementation may include at least one element that corresponds to or is similar to at least one element of the example implementation described previously.

In this example implementation, segmentation may be performed on the image data to segment food item(s) from the background. Segmentation may be performed initially as part of the identification of the region of interest. A segmentation model may be used to implement the segmentation. However, other methods such as user selection via a user interface may be used to indicate the position and/or size of the region of interest. Image-based segmentation may be performed using various techniques, which may include machine learning-based and non-machine learning-based segmentation models. Examples of non-machine learning-based models include boundary detection e.g., by using a threshold to identify an abrupt transition in pixel intensity values within an image where such an abrupt transition may be indicative of a perimeter of a food item.

In this example implementation, identification of the region of interest may be performed e.g., according to any of the examples described above.

In this example implementation, the identification of the phase may be used to separate/distinguish between different cooking phases in accordance with various embodiments described herein. In this example implementation, there are three phases that can be identified by computing the change of color in the region of interest periodically e.g., every 2 mins.

In a first phase, initial cooking occurs. For meat-type of food, the color may gradually change from red/yellow into white. For starch type of food, the size of the food item may expand or grow. In the first phase, the detected color change may be large e.g., by more than a specified pixel intensity value (e.g., more than 2). For example, where pixel intensity values are on a scale of 0 to 255, a pixel intensity value change of more than 2 may indicate that the cooking process could be in the first phase.

In a second phase, the color and/or size of the food item may be stable. For meat type of food, the surface color may become and stay white. For bakery food, the growing may stop during the second phase. In the second phase, the color change may be small e.g., the pixel intensity value change may be less than the specified pixel intensity value (e.g., 2 or less than 2).

In a third phase, the food is cooked and its color might become browned depending on the doneness levels. In this third phase, some food may develop into a darker color for different doneness level. In some cases, the color change in the third phase may be greater than about 4 pixel intensity values to have noticeable color difference. For different doneness level, it may be possible to use a certain pixel intensity value difference to identify different doneness levels, or a prolonged cooking time could be used to identify the doneness levels.

Figure 5:
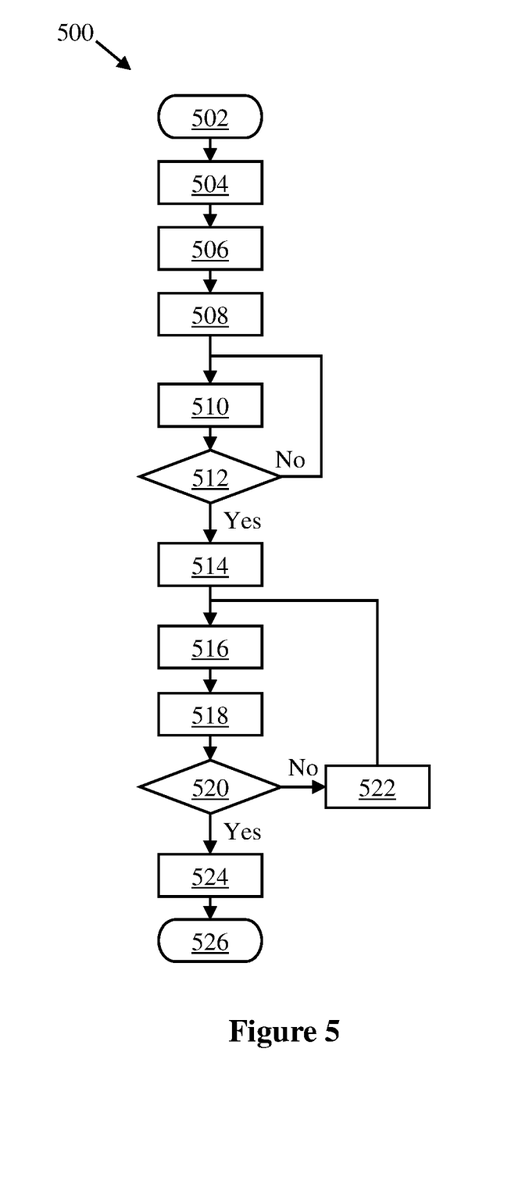
FIG. 5 refers to a cooking method according to an embodiment.

FIG. 5 refers to a cooking method 500 according to an embodiment. The cooking method 500 may be computer-implemented e.g., by a processor of a cooking apparatus, as described above. The method 500 may implement the method 100 and/or various other embodiments described herein. FIG. 5 refers to an example of baking bread. Certain parameter values (e.g., time intervals mentioned below) may be varied depending on the type of food being cooked. The blocks of the method 500 are now described with reference to the description of the method 100 and other embodiments described herein. Certain blocks of the method 500 may be omitted or performed in a different order to that depicted by FIG. 5, in accordance with various embodiments described herein.

The method 500 starts at block 502 (e.g., the cooking process may be started at this point in time).

The method 500 proceeds to block 504 where the food type is identified. This could be automatically identified e.g., by machine vision or input by a user via a user interface associated with the cooking apparatus. In this embodiment, bread is being cooked. However, in other embodiments, if a different food type is identified, the cooking method may be varied appropriately.

The method 500 proceeds to block 506 where the food item is segmented from the background (e.g., using a segmentation model as described previously).

The method 500 proceeds to block 508 where the region of interest is selected.

The method 500 proceeds to block 510 where the cooking time, t, is obtained (i.e., the elapsed time of the cooking process).

The method 500 proceeds to block 512 where a check is made as to whether the cooking time, t, is equal to or greater than a preset starting time (e.g., that depends on the type of food). For bread, this could be 5 minutes. If "no", the method 500 returns to block 510. Otherwise, if "yes", the method 500 proceeds to block 514 where the color information (e.g., pixel intensity values) is extracted from the region of interest of the first image data. After a specified period of time (e.g., 2 minutes after obtaining the first image data, at which time the second image data is obtained), the color information (e.g., pixel intensity values) is extracted from the region of interest of the second image data.

The method 500 proceeds to block 516 where the first color and second color are derived from the average pixel intensity value for the color channel in the region of interest (for each of the first and second image data, respectively). Use of a single color channel such as green has been found to provide sufficient information to implement the method 500 and may reduce usage of compute resources instead of using multiple color channels. Thus, the mean color is calculated for the region of interest (for each of the first and second image data, respectively). That is, the mean color at the first time corresponds to the first color and the mean color at the second time corresponds to the second color.

The method 500 proceeds to block 518 where difference between the first and second color is computed (i.e., the difference between the average pixel intensity values is computed for the color channel).

The method 500 proceeds to block 520 where a comparison between the average pixel intensity values (e.g., for the green) channel with a predefined threshold value is made. The threshold value may be indicative of the phase of the cooking process. As described previously, a change in color by a specified pixel intensity value may indicate a certain phase of the cooking process. If the change is above or below a threshold, this may indicate a transition to another phase of the cooking process. In the example of cooking bread, the first phase may be a growing phase in which there is a large change in color over the time interval. Thus, the comparison with the threshold in the first phase may indicate that the cooking process is still in the first phase (e.g., if the color change is above a first threshold associated with the first phase). However, if the comparison with the threshold in the first phase indicates that the cooking process has transitioned to a second phase (e.g., if the color change is below the first threshold), this may indicate that the cooking process is in the second "size stable" phase. During the second phase, a comparison of the color change with a second threshold associated with the second phase may indicate that the cooking process is still in the second phase (e.g., if the color change is less than the second threshold). However, if the comparison of the color change with a second threshold associated with the second phase indicates that the cooking process has transitioned to a third phase (e.g., if the color change exceeds the second threshold), this may indicate that the cooking process has entered the doneness cooking phase where food becomes more and more well-cooked. Thus, in some embodiments, a different threshold may be defined depending on the phase of the cooking process. The use of more than one threshold may enable a distinction to be made between the different phase of the cooking process.

In other similar words, an observed color change (or lack of color change) may be indicative of the cooking process being in a particular phase or indicate a transition to the next phase of the cooking process, depending on whether or not the color change is above or below a threshold associated with the cooking process. For example, the transition from the first (e.g., size growing and/or color-changing) phase to the second (e.g., size stable and/or color stable) phase could be indicated if the color change is below a (first) threshold (i.e., equal to or above the first threshold may indicate the cooking process is still in the first phase). However, the transition from the second phase to the third phase could be indicated if the color change is equal to or above a second threshold (i.e., below the second threshold may indicate the cooking process is still in the second phase). The threshold(s) associated with the cooking process may be based on the food type since the timing and/or magnitude of the color change observed during the cooking process may depend on the food type. Thus, in some cases, the food type may be determined (e.g., input by a user, detected by machine vision, etc.) and a rule for this food type may be selected for the cooking process, where the rule specifies the threshold(s) to apply during the cooking process.

If the comparison with the threshold is not indicative of a transition to another phase (i.e., "no"), the method 500 may proceed again to block 516 via block 522 where another specified period of time (e.g., 2 minutes) is allowed to elapse before making the next comparison (e.g., if the first and second image data is compared previously, then the next comparison is based on the second and third image data where the third image data is acquired 2 minutes after the second image data). However, if the transition to another phase is indicated (i.e., "yes"), the method 500 proceeds to block 524 where a strategy is implemented to decide how to complete the cooking process.

For example, once the second phase is identified (i.e., the stable color/size phase), the next phase may be the doneness phase where the food may become more browned. Thus, the cooking process may be controlled such that the degree of browning meets a consumer expectation or corresponds to a recipe.

In one example, the strategy may be to keep cooking for another period of time (e.g., for 6 minutes) depending on the heating temperature and/or heating efficiency of the cooking apparatus.

In another example, the strategy is to stop cooking when the color change crosses a threshold (e.g., goes above or below the threshold). For example, if the food is browning, the amount of acceptable browning may be defined by a threshold. Thus, when this threshold is crossed, the cooking process may be stopped or at least the temperature reduced. In case there is some variation in the recipe, ingredients, food preparation by the consumer, etc., this strategy may increase the likelihood of a consistent result and/or prevent overcooking of the food item.

In another example, a hybrid of the previous examples may be implemented. For example, the color change of the food item may be compared with the threshold. However, if the time to reach this color change is longer than a certain predefined time, t, the cooking process may be stopped.

The method 500 ends at block 526.

Figure 6:
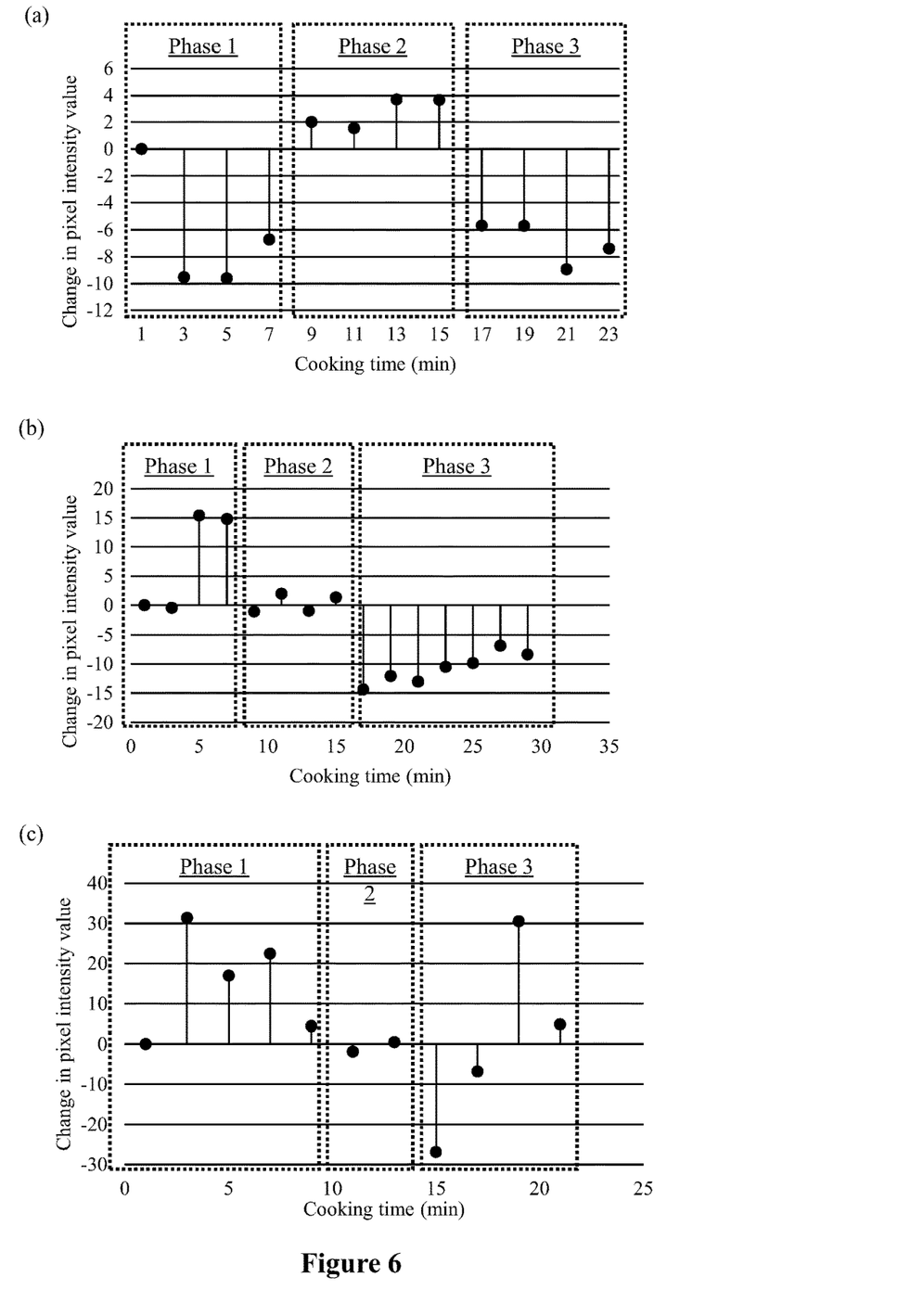

The method 500 may be modified according to food type. For example, some foods such as steak may be acceptably cooked even if rare (thus, not all cooking phases may be observed). FIGS. 6 (*a*)-(*c*) are graphs representative of experimental data collected during a cooking process implemented according to various embodiments. FIG. 6 (*a*) refers to the observed color changes over time in a region of interest when cooking white bread (in this regard, reference can be made to the method 500). FIG. 6 (*b*) refers to the observed color changes over time in a region of interest when cooking cookies. FIG. 6 (*c*) refers to the observed color changes over time in a region of interest when cooking a steak. A same or similar approach to method 500 may be implemented for cooking the cookie or steak although the thresholds may be set at different levels based on the food types. In each graph, the effect of the pixel intensity value change is cumulative. For example, if the change is "−9" between 1 and 3 minutes, and the change is "−9" between 3 and 5 minutes, then the total change between 1 and 5 minutes is "−18".

In FIG. 6 (*a*) there are three phases associated with cooking bread in which the mean pixel intensity value for the green channel of the region of interest was monitored. In phase 1 (from 0 to 7 minutes), the change in pixel intensity value after each time interval is large (e.g., of order 6 to 10) due to the size growing phase of the cooking process. In phase 2 (from 9 to 15 minutes), the change in pixel intensity value after each time interval is small (e.g., of order 2 to 4) due to the size stable phase of the cooking process where the growing stops and the surface of the bread begins to brown. In phase 3 (from 17 to 23 minutes), the change in pixel intensity value after each time interval is large (e.g., of order 6 to 10) due to increased browning of the surface of the bread. From 17 minutes, the surface of the bread was golden brown. Based on preference of doneness level, the cooking process could be stopped at around 17 minutes (e.g., based on this cooking time being a preset time or based on a predefined measure of the browning color indicated by the color derived from the image data).

In FIG. 6 (*b*) there are three phases associated with cooking cookies in which the mean pixel intensity value for the green channel of each of a plurality of regions of interest was monitored. In phase 1 (from 0 to 7 minutes), the change in pixel intensity value after each time interval is large (e.g., of order 15) due to the size growing phase of the cooking process. In phase 2 (from 9 to 15 minutes), the change in pixel intensity value after each time interval is small (e.g., of order 2) due to the size stable phase of the cooking process where the growing stops and the surface of the cookies begin to brown. In phase 3 (from 17 to 29 minutes), the change in pixel intensity value after each time interval is large (e.g., of order 7 to 15) due to increased browning of the surface of the cookies. From 17 minutes, the surface of the cookies began to develop deep-colored browning levels. Based on preference of doneness level, the cooking process could be stopped at around 17 minutes, or earlier for a doughier texture. In this example, three regions of interest were selected for the color change analysis and the results were found to be the same for distinguishing between and identifying the cooking phases for each cookie.

In FIG. 6 (*c*) there are three phases associated with cooking steak in which the mean pixel intensity value for the green channel of the region of interest was monitored. In phase 1 (from 0 to 9 minutes), the change in pixel intensity value after each time interval is large (e.g., of order 5 to 32) due to the pigment change caused by the cooking process (in particular, the loss of red pigment). In phase 2 (from 11 to 13 minutes), the change in pixel intensity value after each time interval is small (e.g., of order 1 to 2) due to the color stable phase of the cooking process where the rate of pigment change decreases. In phase 3 (from 15 to 21 minutes), the change in pixel intensity value after each time interval is large (e.g., of order ±5 to ±32) due to increased browning of the surface of the steak. Depending on user preference, the cooking process could be stopped in any of the phases depending on whether the user wants a rare, medium or well-done steak.

In some cases, it has been found that the green channel provides more accurate and/or sensitive color change information compared with other color channels such as red or blue (which may sometimes appear very bright or very dark, irrespective of the phase of the cooking process), hence why the green channel was used in the above experiments. However, the other color channels may still be suitable for use in measuring color change information. For example, different cooking apparatus setups with different illumination systems and/or cameras may have different sensitivities for different color channels. Further, the color channel(s) that may be used may depend on the food type. Each food type may have a different spectral reflectance to the food types used in the experiments described herein.

Other experimental data has demonstrated that the approach of the various embodiments described herein can be applied to other food types such as chicken breast, chicken wing, salmon, etc., in order to identify the cooking phases and facilitate enhanced monitoring of the cooking process.

Figure 7:
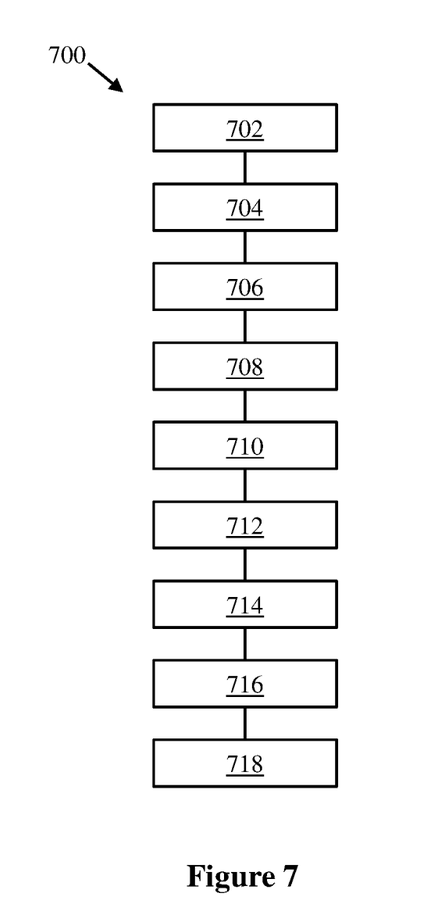
FIG. 7 refers to a cooking method according to various embodiments.

FIG. 7 refers to a cooking method 700 according to various embodiments. The cooking method 700 may be computer-implemented e.g., by a processor of a cooking apparatus, as described previously. The method 700 implements the cooking method 100 as well as further embodiments described below (some of which are referred to previously). Certain blocks of the method 700 may be omitted or performed in a different order to that shown by FIG. 7 according to the various embodiments.

In some embodiments, the cooking method 700 comprises, at block 702, using a segmentation model to segment the first image data to identify the perimeter and/or at least part of the first area of the food item. The cooking method 700 further comprises, at block 704, selecting the region of interest in the segmented first image data. The cooking method 700 further comprises, at block 706, using the same region of interest in the second image data. Using the same region of interest in the images acquired subsequently to the first image data may avoid the need to re-segment the image data and perform any re-selection of the region of interest since the same pixels are used between images, which may save compute resource.

In some embodiments, the phase comprises an expanding phase in which the food item expands (e.g., grows) as a result of the cooking process.

In some embodiments, the phase comprises a shrinking phase in which the food item shrinks as a result of the cooking process.

In some embodiments, the phase comprises a size stable phase in which the food item stays the same size. This may be approximate and there may be some size change, however the size change in the size stable may be less than in the size change phase.

In some embodiments, the phase comprises a pigmentation change phase in which a pigmented component of the food item escapes from the food item and/or undergoes a chemical change as a result of the cooking process.

In some embodiments, the phase comprises a doneness phase in which the cooking process is completed and/or browning of the food item occurs as a result of the cooking process.

In some embodiments, the first color is derived from pixel intensity data (i.e., pixel intensity value(s)) associated with the part of the first image data that corresponds to the region of interest. Further, the second color is derived from pixel intensity data associated with the part of the second image data that corresponds to the region of interest.

In some embodiments, the cooking method 700 comprises, at block 708, deriving the first color from the pixel intensity data (i.e., pixel intensity value(s)) for the part of the first image data that corresponds to the region of interest. The cooking method 700 further comprises, at block 710, deriving the second color from the pixel intensity data for the part of the second image data that corresponds to the region of interest. The cooking method 700 further comprises, at block 712, comparing the first color with the second color to determine a color change between the first and second times. The cooking method 700 further comprises, at block 714, identifying the phase by comparing the color change with a threshold indicative of the phase of the cooking process.

In some embodiments, the first and second color is represented by a color channel of a color model for representing color of the food item.

In some embodiments, the color model is a red-green-blue, RGB, color model. In some embodiments, the first and second color is represented by a single color channel of the RGB color model (e.g., green). Using a single color channel may reduce compute resources needed to implement certain embodiments described herein. In some embodiments, a plurality of color channels may be used (e.g., red plus blue, red plus green, green plus blue, red plus green plus blue, etc.). For example, a function may be applied as described below in order to derive the first and second color from the plurality of color channels. In some embodiments, the color model may be the HSV color model or any other appropriate color model that may be used to represent color in image data.

In some embodiments, a function is applied to the pixel intensity data for the part of the first image data to derive the first color. The function is further applied to the pixel intensity data for the part of the second image data to derive the second color In some embodiments, the function comprises an averaging function to compute an average (e.g., mean) pixel intensity value corresponding to the first color or second color. The average pixel intensity value corresponding to the first color or second color is computed from the pixel intensity data of a set of pixels corresponding to the part of the first image data or second image data, respectively. The set of pixels is associated with the color channel. For example, the function may add up the pixel intensity values for the color channel in the region of interest and then divide the total pixel intensity value by the number of pixels for the color channel in order to compute the mean pixel intensity value. Some embodiments refer to use of a single color channel such as green. However, in some embodiments, the pixel intensity data from a plurality color channels could be used to compute the average pixel intensity value.

In some embodiments, the function comprises a weighting function to compute a weighted pixel intensity value corresponding to the first color or second color. The weighted pixel intensity value corresponding to the first color or second color is computed from a weighted combination of the pixel intensity data of a plurality of subsets of the set of pixels corresponding to the part of the first image data or second image data, respectively. Each subset is associated with a different color channel. The average pixel intensity value for every channel in the RGB color model yields a value corresponding to the color grey. Therefore, the weighting function may be to bias towards at least one of the color channels such as green. For example, a greater weight may be applied to the green channel instead of the red and/or blue channel. In some cases, a first subset of the set of pixels comprises the red pixels, a second subset of the set of pixels comprises the green pixels, a third subset of the set of pixels comprises the blue pixels. Thus, by weighting the pixel intensity values in at least one of these channels (i.e., at least one of the subsets), this weighting may yield a bias towards at least one of these colors.

In some embodiments, the cooking method 700 comprises, at block 716, determining whether or not the identified phase of the cooking process corresponds to an expected phase of the cooking process based on recipe instructions for the food item and/or historical cooking data for the food item.

In some embodiments, the recipe instructions comprise a cooking temperature and a cooking time at the cooking temperature for each phase of the cooking process. The historical cooking data comprises the cooking temperature and the cooking time at the cooking temperature used to cook the food item previously in the cooking process.

For example, the user may have an expectation of how well cooked a food item is during a cooking process. This expectation may be based on recipe instructions and/or historical cooking data, which may indicate the expected color at an expected time of the cooking process for the cooking temperature.

In some embodiments, the cooking method 700 comprises, at block 718, instructing the cooking apparatus to modify the cooking process.

In some embodiments, the modification of the cooking process may be in response to the recipe instructions being indicative of a different cooking temperature and/or cooking time at the cooking temperature to use for the identified phase of the cooking process or a subsequent phase of the cooking process In some embodiments, the modification of the cooking process may be in response to the identified phase of the cooking process being indicative of a deviation from the expected phase of the cooking process.

In some embodiments, selecting the region of interest is based on a selection rule that indicates a location of the region of interest to use for the food item.

In some embodiments, selecting the region of interest is based on a selection rule that indicates a shape of the region of interest.

In some embodiments, the selection rule indicates the location and/or shape based on a positioning rule about positioning of the region of interest with respect to a segmented part of the first and second image data. For example, the segmented part may be indicative of the perimeter of the food item and the positioning rule may specify the location of the region of interest with respect to the perimeter.

In some embodiments, the selection rule indicates the location and/or shape based on a type of the food item. For example, different types of food items have a different form (e.g., big, small, irregular surface, smooth surface, symmetrical shape, asymmetrical shape, etc.). This may mean that certain areas on the surface of the food item are preferred locations for the region of interest. Based on knowledge of the type of food item, the selection rule may indicate the most appropriate location and/or shape of the region of interest.

In some embodiments, the selection rule indicates the location and/or shape based on a design of the cooking apparatus. For example, the design of the cooking apparatus may refer to the size of the cooking chamber, positioning of the illumination system, positioning of the camera, etc. Based on knowledge of the design, the selection rule may indicate the most appropriate location and/or shape of the region of interest.

In some embodiments, the cooking method 700 is implemented by a processor (e.g., a processor of the controller 206) of the cooking apparatus.

Figure 8:
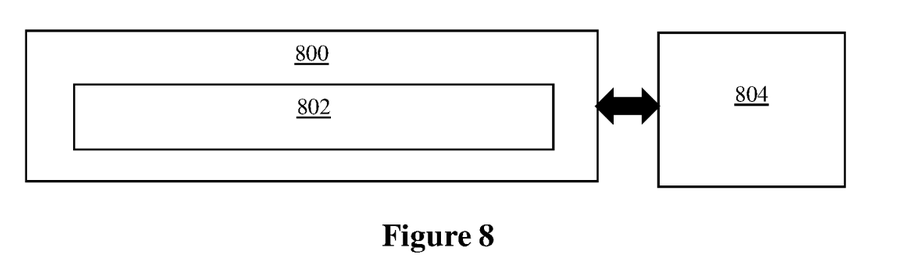
FIG. 8 is a schematic drawing of a machine-readable medium for implementing various embodiments.

FIG. 8 is a schematic drawing of a non-transitory machine-readable medium 800 for implementing various embodiments described herein. As used herein, the term "non-transitory" does not encompass transitory propagating signals. The machine-readable medium 800 stores instructions 802 readable and executable by a processor 804 to implement the method of any of the embodiments described herein (e.g., cooking methods 100, 500, 700 and/or related embodiments). The machine-readable medium 800 and/or the processor 804 may be implemented by any of the controller 206, cloud computing service 210, user equipment 212 and/or controller 312 of FIG. 2 or 3.

Figure 9:
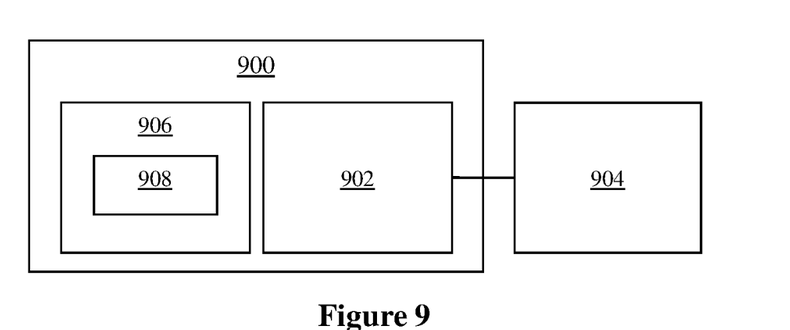
FIG. 9 is a schematic drawing of apparatus for implementing various embodiments.

FIG. 9 is a schematic drawing of apparatus 900 for implementing various embodiments described herein. The apparatus 900 may be implemented by any of the controller 206, cloud computing service 210, user equipment 212 and/or controller 312 of FIG. 2 or 3.

The apparatus 900 comprises a processor 902. The processor 902 is configured to communicate with an interface 904. The interface 904 may be any interface (wireless or wired) implementing a communications protocol to facilitate exchange of data (e.g., image data, cooking apparatus control instructions, etc.) with other devices such as another part of the cooking ecosystem 200.

The apparatus 900 further comprises a memory 906 (e.g., non-transitory or otherwise) storing instructions 908 readable and executable by the processor 902 to implement various embodiments described herein (e.g., cooking method 100 or any of the associated embodiments). Any of the models described herein may be implemented by the processing circuitry for implementing the cooking methods described herein. Thus, certain blocks of the cooking methods may involve use of such models in order to provide the stated functionality. The models may be ML-based or non-ML-based. However, certain embodiments described herein refer to use of non-ML-based models, which may avoid the need to use extensive compute resources and/or enable local processing.

While the invention has been illustrated and described in detail in the drawings and foregoing description, such illustration and description are to be considered illustrative or exemplary and not restrictive; the invention is not limited to the disclosed embodiments.

One or more features described in one embodiment may be combined with or replace features described in another embodiment.

Embodiments in the present disclosure can be provided as methods, systems or as a combination of machine-readable instructions and processing circuitry. Such machine-readable instructions may be included on a non-transitory machine (for example, computer) readable storage medium (including but not limited to disc storage, CD-ROM, optical storage, flash storage, etc.) having computer readable program codes therein or thereon.

The present disclosure is described with reference to flow charts and block diagrams of the method, devices, and systems according to embodiments of the present disclosure. Although the flow charts described above show a specific order of execution, the order of execution may differ from that which is depicted. Blocks described in relation to one flow chart may be combined with those of another flow chart. It shall be understood that each block in the flow charts and/or block diagrams, as well as combinations of the blocks in the flow charts and/or block diagrams can be realized by machine readable instructions.

The machine-readable instructions may, for example, be executed by a general-purpose computer, a special purpose computer, an embedded processor, or processors of other programmable data processing devices to realize the functions described in the description and diagrams. In particular, a processor or processing circuitry, or a module thereof, may execute the machine-readable instructions. Thus, functional modules of apparatus and other devices described herein may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate array etc. The methods and functional modules may all be performed by a single processor or divided amongst several processors.

Such machine-readable instructions may also be stored in a computer readable storage that can guide the computer or other programmable data processing devices to operate in a specific mode.

Such machine-readable instructions may also be loaded onto a computer or other programmable data processing devices, so that the computer or other programmable data processing devices perform a series of operations to produce computer-implemented processing, thus the instructions executed on the computer or other programmable devices realize functions specified by block(s) in the flow charts and/or in the block diagrams.

Further, the teachings herein may be implemented in the form of a computer program product, the computer program product being stored in a storage medium and comprising a plurality of instructions for making a computer device implement the methods recited in the embodiments of the present disclosure.

Elements or steps described in relation to one embodiment may be combined with or replaced by elements or steps described in relation to another embodiment. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored or distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A cooking method, comprising:
   receiving first image data corresponding to a view of a food item at a first time of a cooking process implemented by a cooking apparatus, wherein a perimeter of the food item visible in the view encloses a first area of the food item;
   receiving second image data corresponding to the view of the food item at a second time of the cooking process;
   selecting a region of interest in the view, wherein the region of interest maps to a second area of the food item, and wherein the second area is less than the first area; and
   identifying a phase of the cooking process based on a comparison of a first color of the food item at the first time with a second color of the food item at the second time, wherein the first color is derived from a part of the first image data that corresponds to the region of interest, and wherein the second color is derived from a part of the second image data that corresponds to the region of interest.

2. The cooking method of claim 1, comprising determining whether or not the identified phase of the cooking process corresponds to an expected phase of the cooking process based at least on recipe instructions for the food item or historical cooking data for the food item.

3. The cooking method of claim 2, wherein:
   the recipe instructions comprise a cooking temperature and a cooking time at the cooking temperature for each phase of the cooking process; and
   the historical cooking data comprises the cooking temperature and the cooking time at the cooking temperature used to cook the food item previously in the cooking process.

4. The cooking method of claim 2, comprising instructing the cooking apparatus to modify the cooking process in response to at least one of:
   the recipe instructions being indicative at least one of a different cooking temperature or a cooking time at the cooking temperature to use for the identified phase of the cooking process or a subsequent phase of the cooking process; or
   the identified phase of the cooking process being indicative of a deviation from the expected phase of the cooking process.

5. The cooking method of claim 1, wherein the phase comprises:
   an expanding phase in which the food item expands as a result of the cooking process;
   a shrinking phase in which the food item shrinks as a result of the cooking process;
   a size stable phase in which the food item stays the same size;
   a pigmentation change phase in which a pigmented component of the food item escapes from the food item or undergoes a chemical change as a result of the cooking process; and
   a doneness phase in which the cooking process is completed or browning of the food item occurs as a result of the cooking process.

6. The cooking method of claim 1, wherein:
   the first color is derived from pixel intensity data associated with the part of the first image data that corresponds to the region of interest; and
   the second color is derived from pixel intensity data associated with the part of the second image data that corresponds to the region of interest.

7. The cooking method of claim 6, comprising:
   deriving the first color from the pixel intensity data for the part of the first image data that corresponds to the region of interest;
   deriving the second color from the pixel intensity data for the part of the second image data that corresponds to the region of interest;
   comparing the first color with the second color to determine a color change between the first and second times; and
   identifying the phase by comparing the color change with a threshold indicative of the phase of the cooking process.

8. The cooking method of claim 7, wherein:
   the first and second colors are represented by a color channel of a color model for representing color of the food item.

9. The cooking method of claim 8, wherein the color model is a red-green-blue, RGB, color model, and wherein the first and second colors are represented by a single color channel of the RGB color model.

10. The cooking method of claim 8, comprising applying a function to:
    the pixel intensity data for the part of the first image data to derive the first color; and
    the pixel intensity data for the part of the second image data to derive the second color, wherein the function comprises one of:
    an averaging function to compute an average pixel intensity value corresponding to the first color or second color, wherein the average pixel intensity value corresponding to the first color or second color is computed from the pixel intensity data of a set of pixels corresponding to the part of the first image data or second image data, respectively, and wherein the set of pixels is associated with the color channel; or a weighting function to compute a weighted pixel intensity value corresponding to the first color or second color, wherein the weighted pixel intensity value corresponding to the first color or the second color is computed from a weighted combination of the pixel intensity data of a plurality of subsets of the set of pixels corresponding to the part of the first image data or the second image data, respectively, and wherein each subset is associated with a different color channel.

11. The cooking method of claim 1, comprising:
using a segmentation model to segment the first image data to identify at least one of the perimeter or at least part of the first area of the food item;
selecting the region of interest in the segmented first image data; and
using the same region of interest in the second image data.

12. The cooking method of claim 1, comprising:
selecting the region of interest based on a selection rule that indicates at least one of:
a location of the region of interest to use for the food item; or
a shape of the region of interest, wherein the selection rule indicates the location or shape based on:
a positioning rule about positioning of the region of interest with respect to a segmented part of the first and second image data;
a type of the food item; and
a design of the cooking apparatus.

13. The cooking method of claim 1, wherein the method is implemented by a processor of the cooking apparatus.

14. A non-transitory machine readable medium storing instructions readable and executable by a processor to:
receive first image data corresponding to a view of a food item at a first time of a cooking process implemented by a cooking apparatus, wherein a perimeter of the food item visible in the view encloses a first area of the food item;
receive second image data corresponding to the view of the food item at a second time of the cooking process;
select a region of interest in the view, wherein the region of interest maps to a second area of the food item, and wherein the second area is less than the first area; and
identify a phase of the cooking process based on a comparison of a first color of the food item at the first time with a second color of the food item at the second time, wherein the first color is derived from a part of the first image data that corresponds to the region of interest, and wherein the second color is derived from a part of the second image data that corresponds to the region of interest.

15. A cooking apparatus for implementing a cooking process, comprising:
a cooking chamber for receiving a food item;
a housing defining the cooking chamber;
an air circulation system for circulating air flow inside the cooking chamber;
a camera for capturing images during the cooking process; and
a controller configured to:
receive first image data corresponding to a view of a food item at a first time of a cooking process implemented by a cooking apparatus, wherein a perimeter of the food item visible in the view encloses a first area of the food item;
receive second image data corresponding to the view of the food item at a second time of the cooking process;
select a region of interest in the view, wherein the region of interest maps to a second area of the food item, and wherein the second area is less than the first area; and
identify a phase of the cooking process based on a comparison of a first color of the food item at the first time with a second color of the food item at the second time, wherein the first color is derived from a part of the first image data that corresponds to the region of interest, and wherein the second color is derived from a part of the second image data that corresponds to the region of interest.

* * * * *